United States Patent [19]
Felker

[11] 4,206,932
[45] Jun. 10, 1980

[54] DIAPHRAGM CHUCK WITH LOCKING RING

[75] Inventor: Merle Felker, Traverse City, Mich.

[73] Assignee: Sheffer Collet Company, Traverse City, Mich.

[21] Appl. No.: 16,012

[22] Filed: Feb. 28, 1979

[51] Int. Cl.² .............................................. B23B 31/32
[52] U.S. Cl. .................................. 279/1 D; 279/1 C; 279/4
[58] Field of Search ............... 279/1 D, 1 DC, 1 ME, 279/1 DA, 1 R, 4, 1 C

[56] References Cited
U.S. PATENT DOCUMENTS

| | | | |
|---|---|---|---|
| 2,742,296 | 4/1956 | Satierlee et al. | 279/1 D |
| 2,958,532 | 11/1960 | Benjamin et al. | 279/1 D |

FOREIGN PATENT DOCUMENTS

| | | | |
|---|---|---|---|
| 846256 | 8/1960 | United Kingdom | 279/1 D |
| 323193 | 2/1972 | U.S.S.R. | 279/1 D |
| 496100 | 3/1976 | U.S.S.R. | 279/1 D |

*Primary Examiner*—William R. Briggs
*Attorney, Agent, or Firm*—Price, Heneveld, Huizenga & Cooper

[57] ABSTRACT

A diaphragm type chuck is disclosed equipped with means to lock the work engaging jaws against inadvertent release due to centrifugal forces. The means automatically shifts into jaw locking position when the chuck is closed and automatically releases the jaws when the chuck is to be opened.

14 Claims, 4 Drawing Figures

DIAPHRAGM CHUCK WITH LOCKING RING

FIELD OF THE INVENTION

This invention relates to chucks and particularly to chucks of the diaphragm type wherein the jaws are mounted on a panel or diaphragm which can be deflected in such a manner as to pivot the chuck jaws toward and away from one another and, thus, into and out of work clamping position. The invention provides means by which the jaws are positively locked in work clamping position and held against separation resulting from centrifugal forces incident to the use of the chuck.

BACKGROUND OF THE INVENTION

Diaphragm chucks are well known in the art and have been extensively used. They have, however, been subject to a serious limitation. Due to the nature of the chuck, as the speed of the chuck increases, the resulting centrifugal force acts to bias the jaws of the chuck to open. As a result, this type of chuck has been limited to relatively slow speeds to avoid build up of centrifugal force. It has been attempted to overcome this problem by making the diaphragm stiffer, increasing resistance to centrifugal forces. This, however, materially increases the weight of the chuck and requires much higher forces to overcome the diaphragm's resistance to open the chuck. The degree of improvement that can be accomplished by this technique is quite limited.

Despite these shortcomings, diaphragm chucks have been used frequently because they have the desirable characteristics of being relatively compact and of simple construction and, thus, relatively inexpensive.

BRIEF DESCRIPTION OF THE INVENTION

The invention provides a positive means by which the position of the jaws of the chuck is positively locked when the chuck is closed, eliminating the possibility of the jaws opening due to centrifugal force. The invention provides such a means which automatically forms the lock when the chuck is closed and automatically releases the lock before the chuck actuator initiates deflection of the diaphragm to create positive release of the jaws. The invention provides a chuck of the diaphragm type capable of substantially increased operating speeds without materially increasing either the complexity or the weight of the chuck.

DESCRIPTION OF THE PREFERRED EMBODIMENT

Figure 1:
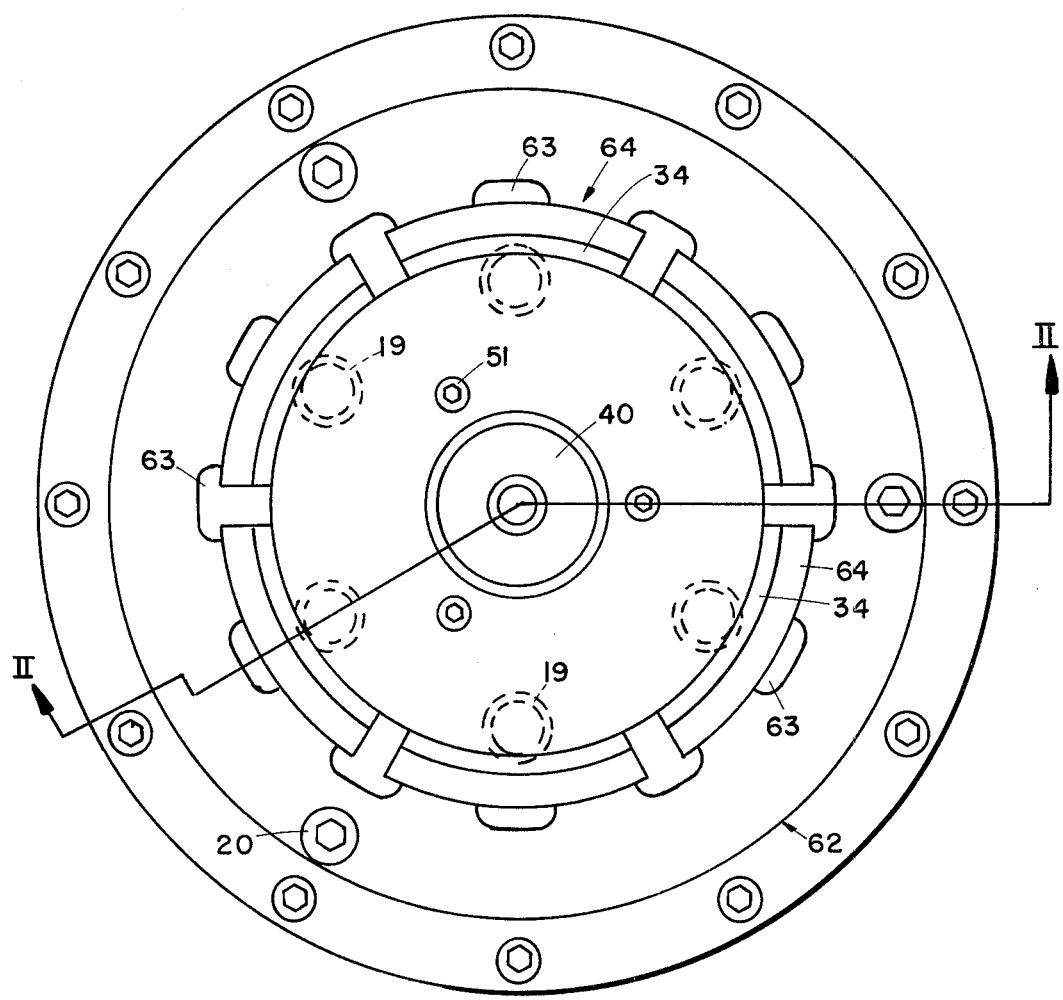
FIG. 1 is a front end view of a chuck incorporating this invention.

The numeral 10 refers to a chuck body having a back plate 11 and a front plate 12. The plates 11 and 12 are circular and the front portion of plate 12 is offset axially forward of the rear plate by means of the peripheral flange 13. The forward portion of the front plate is formed by a panel at the center of which is an axially extending opening 15. The space between the panel 14 and the back plate 11 forms a chamber 16 within which is seated the actuator or piston 17. The actuator 17 extends entirely across the chamber and forms a seal with the walls of the chamber by means of the O-ring 18. The actuator 17 is biased toward the back plate 11 by means of the plurality of springs 19, each having one end recessed into the panel 14 of the front plate 12 and the other end recessed into the front face of the actuator 17. The plates 11 and 12 are secured together by means of bolts or cap screws 20. Fluid can be admitted to the portion of the chamber 16 between the actuator 17 and the rear plate 11 through the threaded conduit 21.

Figure 2:
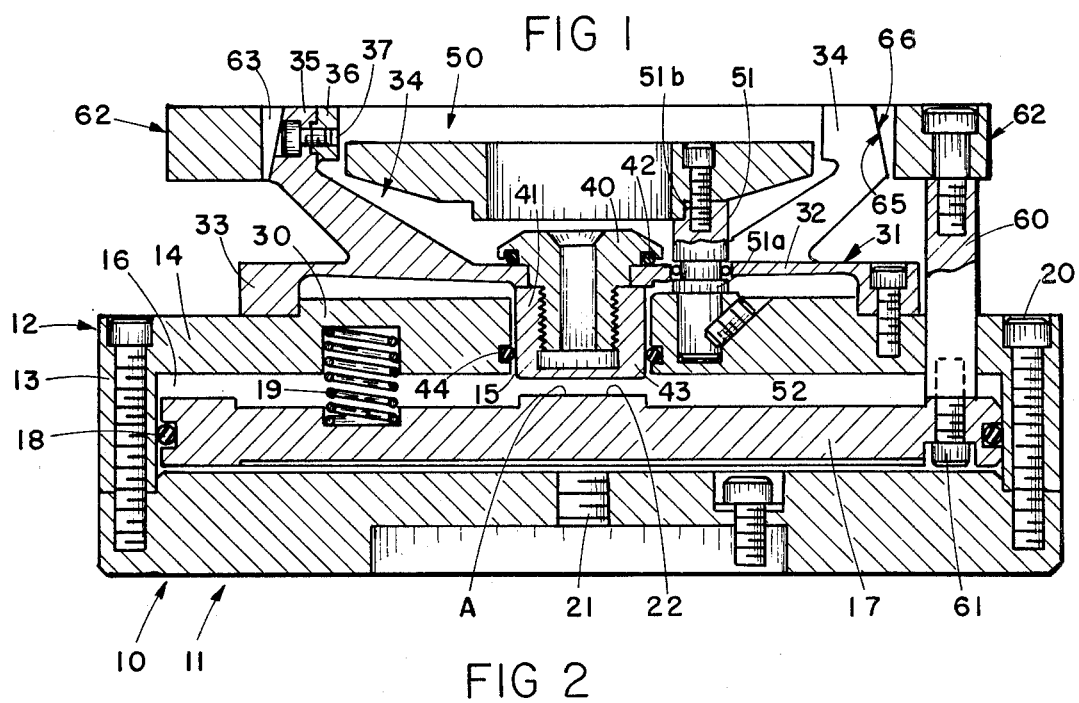
FIG. 2 is a sectional view taken along the plane II—II of FIG. 1 showing the chuck in work piece clamping positions.
Figure 3:
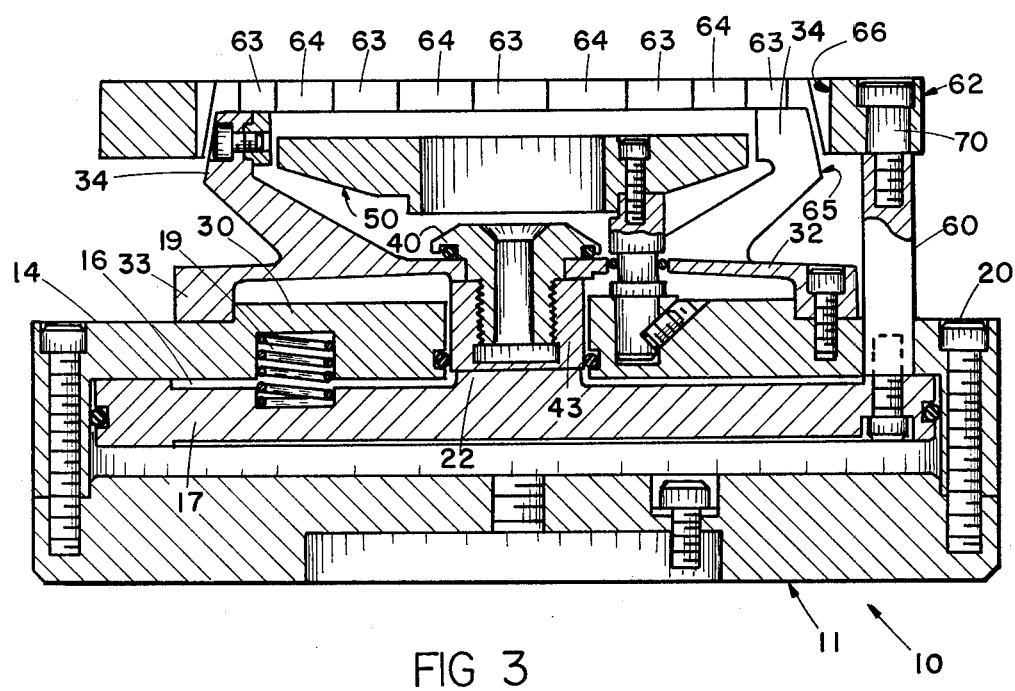
FIG. 3 is a view similar to FIG. 2 showing the chuck in work piece release position.

The forward or front face of the panel 14 has an enlarged forwardly extending boss 30. Seated over this boss 30 is a diaphragm plate 31 consisting of a centrally apertured, relatively thin-walled panel 32 having at its periphery a circular flange 33. The flange 33 serves as a leg and seats over the boss 30. Integral with the panel 32 are forwardly extending jaws 34. Each of the jaws is integral with the diaphragm plate 31 and each consists of a leg portion which slopes downwardly and inwardly and is joined to the diaphragm at a point intermediate the flange 33 and the open central portion of the diaphragm. Each jaw at its outer end has an axially extending lip 35 on which is mounted a work engaging grip or pad 36. The pads can be mounted in any suitable manner such as by means of the screws 37. The shape of the legs of the jaws 34 is such that the lips 35 are generally parallel to the central axis of the chuck. The number of jaws 34 is a matter of design choice, but in the illustrated preferred embodiment, six are provided. Between the legs of the jaws, the panel 32 of the diaphragm plate 31 is relatively thin and is, thus, capable of being flexed from a generally flat position as illustrated in FIG. 2 to a somewhat convex or dome shape configuration as illustrated in FIG. 3. The degree of deflection illustrated in FIG. 3 is exaggerated for purposes of clarity.

The center of the diaphragm has an opening in which is seated a central plug 40. The plug 40 has an externally threaded leg which threadedly engages the center cap 41. The forward end of the cap 41 has a radially extending, peripheral flange overlapping the adjacent edge of the diaphragm plate 31 and forming a seal with the surface of the plate by means of the O-ring 42. The central plug 41 extends through the central opening 15 of the plate 12 and projects a short distance into the chamber 16 to form a boss 43. A seal is formed between the central plug 41 and the walls of the panel 31 by means of an O-ring 44.

Seated concentrically within the jaws 34 and forward of the forward end of the central plug 40 is a work stop 50. The work stop 50 is secured to the front plate 12 by means of supports 51. A clearance opening is provided in the diaphragm plate for each support 51. The axial position of the work stop 50 is positively established by the shoulder 51a on the support 51 and a further lock is created by the seated notch 51b at the forward end of the support. The set screw 52 both forces the shoulder 51a to seat against the surface of the panel 14 and locks the support against rotation with the notch 51b properly positioned to receive the work stop. While the number of supports 51 is a matter of design choice, in the preferred embodiment illustrated, three are provided. Such work stops are conventional and form no part of the invention.

Projecting forwardly from the periphery of the actuator 17 are three support elements or posts 60. Each of these is rigidly secured to the actuator by suitable means such as a cap screw 61. Secured to the outer end of the support posts 60 by shoulder bolts 70 is a clamping ring 62. The ring 62 surrounds the jaws of the chuck and has a series of inwardly facing cutouts 63 which form circumferentially spaced fingers 64. The fingers seat against the radially outer faces of the jaws 34. The radially outer faces 65 of the jaws 34 are inclined at a small angle in such a manner that these faces are of progressively decreasing radius as the jaws extend away from the body of the chuck. The inner diameter face 66 of the clamping ring 62 is also inclined but in the opposite direction so that its inner face is complimentary to the outer faces of the jaws. Thus, there is formed a camming or wedging relationship between the inner face 66 of the locking ring 62 and the outer faces 65 of the jaws.

Assuming the chuck to be in the position illustrated in FIG. 2, to load the chuck with work a suitable fluid such as hydraulic is introduced through the port 21 into the chamber rearwardly of the actuator 17. When sufficient pressure has been introduced, the actuator shifts forwardly, compressing the springs 19. As it does so, it also shifts the clamping ring 62 forwardly the same distance, thus, releasing the ring 62 from the jaws 34. This is accomplished during what might be termed a lost motion movement occurring when the piston 17 moves forwardly to close the gap A between the boss 22 and the boss 43. Once the gap A is closed, the actuator 17 pushes the center cap and center plug forwardly. In so doing, the central portion or the panel 32 of the diaphragm plate 31 will be forced forwardly into a dome-like configuration as illustrated in FIG. 3. This will rock the jaws 34 such that the outer ends of the jaws will shift a significant radial distance outwardly releasing any work seated between them.

After an appropriate work piece has been placed between the jaws, the procedure is reversed. In this case, fluid is released from the chamber behind the actuator 17, permitting the springs 19 to take over. The springs 19 then shift the actuator rearwardly. As this occurs, the bosses 22 and 43 will shift rearwardly and ultimately disengage permitting the diaphragm 32 of the diaphragm plate 31 to resume its normal position, pivoting the jaws 34 inwardly to clamp the work. As the actuator 17 shifts further rearwardly under the influence of the springs 19, the ring 32 will be brought into contact with the jaws and will form a tight, wedging fit against the outer face of the jaws.

Figure 4:
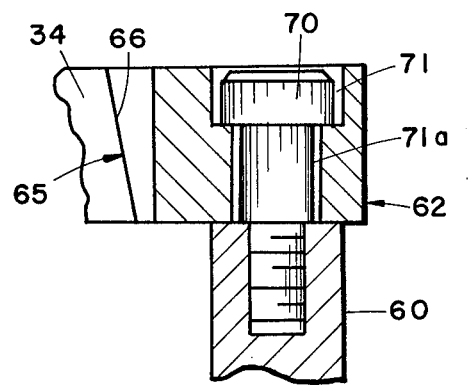
FIG. 4 is a fragmentary, enlarged view of the attachment of the locking ring to one of its supporting posts.

To permit the ring 62 to adjust for any lack of concentricity between it and the jaws, the ring has limited freedom to float radially of the jaws. This is accomplished by providing oversize openings 71 and 71a for the head and shank respectively of the shoulder bolts 70 (FIG. 4). The use of shoulder bolts prevents the bolts from being tightened such that the ring would be restrained from floating. Thus, the locking effect of the ring will not result in radial shift of the work piece.

This construction assures a strong gripping action of the work piece and also positively locks the jaws against any possible radially outward shift due to centrigual forces generated when the chuck is used. Since the ring 62 forms a continuous annulus or clamp around the jaws and its position is controlled by the axially extending springs 19, it is not affected by the centrifugal forces and nothing in the operation of the chuck will tend to shift it into jaw releasing position. In this manner, a diaphragm chuck having a reasonably thin and, thus, flexible diaphragm panel 32 can be made to affect a positive work piece grip which will remain locked irrespective of centrifugal forces. This is not only an improvement in the capacity of the chuck, but it is also a material improvement in the safety of the chuck.

It will be recognized that the degree of clamping pressure exerted by the clamping ring 62 can be controlled by varying the strength of the springs 19. It could also be varied by changing the number of the springs to a lesser or a greater number, depending on the desired result. It will also be recognized that the positive locking of the clamping jaws is not dependent upon a continuous supply of hydraulic fluid or upon any mechanical operation other than that provided by the springs. Thus, the structure provides a dependable and simple lock capable of a greatly increased range of operating speeds.

It will also be recognized that the device need not necessarily be actuated by hydraulic fluid. The actuator 17 could be designed as a spider with three legs each mounting one of the support posts 60 with the axial movement of the actuator being affected by mechanical means such as a rod or similar device. It will be recognized that the diaphragm plate 31 must be made from a material capable of flexing but also having resiliency and memory so that it will positively nd forcefully return to its flat position whenever the force shifting it into a domed or convex condition is released. For this purpose, steel is a preferred material.

While a preferred construction for this invention has been described together with a modification, other modifications may be made without departing from the principles of the invention. Such modifications are to be considered as included within the hereinafter pended claims unless these claims, by their language, expressly state otherwise.

The embodiments of the invention in which an exclusive property or privilege is claimed are defined as follows.

1. A diaphragm type chuck having a chuck body, a normally substantially flat diaphragm secured at its periphery to said body; a plurality of spaced radially extending work gripping jaws arranged in a circle and mounted on one face of said diaphragm, a chuck actuator axially movable with respect to said chuck body having means thereon centrally engaging said diaphragm for deflecting said diaphragm to render said one face thereof convex, said chuck characterized in that clamping means is provided adjacent the radial outer end of each of said jaws; elements mounting said clamping means to said chuck actuator for movement therewith axially of said chuck body between a jaw clamping position radially aligned with said jaws and a release position axially remote from said jaws.

2. A diaphragm type chuck as described in claim 1 further characterized in that the radially outer ends of said jaws and said clamping means have complementary camming surfaces inclined to increase radially inward clamping pressure as said clamping means shifts toward said diaphragm.

3. A diaphragm type chuck as described in claim 2 further characterized in that said chuck actuator and said diaphragm are operatively connected by a lost motion connection, said actuator being movable axially of said diaphragm a distance sufficient to release said clamping means from said jaws before said actuator initiates convex movement of said diaphragm.

4. A diaphragm type chuck as described in claim 1 further characterized in that said chuck actuator includes a member, said element secured to said member at its periphery; a first central boss on said member extending toward said diaphragm; a second central boss on said diaphragm extending toward and axially aligned with said first central boss, said bosses being spaced apart when diaphragm is in its normally flat position and providing a lost motion connection permitting said clamping means to release said jaws before deflection of said diaphragm is initiated.

5. A diaphragm type chuck as described in claim 4 further characterized in that springs are provided urging said chuck actuator away from said diaphragm.

6. A diaphragm type chuck as described in claim 5 further characterized in that said chuck body has a radially inwardly extending portion between said member and said diaphragm, said springs being compression springs and having one end seated against said inwardly extending portion.

7. A diaphragm type chuck as described in claim 4 further characterized in that said member is a piston slidingly cooperating with said chuck body to form a fluid chamber on the side thereof remote from said diaphragm whereby movement of said member against said springs can be affected by fluid pressure.

8. A diaphragm type chuck as described in claim 1 wherein said clamping means is an annulus, the inner diameter face of said annulus being inclined to form a camming surface of progressively decreasing radius outwardly from said diaphragm.

9. A diaphragm chuck as described in claim 8 wherein the radially outer surfaces of said jaws are inclined to be complementary to the inner diameter face of said clamping means.

10. A diaphragm chuck as described in claim 8 wherein said elements are circumferentially spaced posts supporting said clamping means in axially spaced relationship to said actuator.

11. A diaphragm type chuck as described in claim 1 wherein said clamping means is an annulus.

12. A diaphragm type chuck as described in claim 1 wherein said clamping means has a limited degree of radial movement with respect to said mounting elements.

13. A diaphragm type chuck as described in claim 11 wherein said clamping means has a limited degree of radial movement with respect to said mounting elements.

14. A diaphragm type chuck as described in claim 10 wherein a threaded fastener joins said clamping means to each of said posts, oversize openings being provided in said clamping means for said fasteners to permit said clamping means limited movement radially with respect to said posts and jaws.

* * * * *